(12) United States Patent
Hirakawa et al.

(10) Patent No.: US 11,892,398 B2
(45) Date of Patent: Feb. 6, 2024

(54) SENSOR FOR DETERMINING LIQUID TYPES

(71) Applicant: TOYOKO KAGAKU CO., LTD., Kawasaki (JP)

(72) Inventors: Kiyoshi Hirakawa, Yokohama (JP); Seung-Woo Lee, Kitakyushu (JP)

(73) Assignee: TOYOKO KAGAKU CO., LTD., Kawasaki (JP)

( * ) Notice: Subject to any disclaimer, the term of this patent is extended or adjusted under 35 U.S.C. 154(b) by 218 days.

(21) Appl. No.: 17/440,279

(22) PCT Filed: May 11, 2021

(86) PCT No.: PCT/JP2021/017903
§ 371 (c)(1),
(2) Date: Sep. 17, 2021

(87) PCT Pub. No.: WO2022/137590
PCT Pub. Date: Jun. 30, 2022

(65) Prior Publication Data
US 2022/0397516 A1 Dec. 15, 2022

(30) Foreign Application Priority Data
Dec. 24, 2020 (JP) ................. 2020-214874

(51) Int. Cl.
*G01N 21/31* (2006.01)
*G02B 6/42* (2006.01)

(52) U.S. Cl.
CPC ........... *G01N 21/31* (2013.01); *G02B 6/4202* (2013.01); *G01N 2201/08* (2013.01)

(58) Field of Classification Search
CPC ... G01N 21/31; G01N 2201/08; G02B 6/4202
See application file for complete search history.

(56) References Cited

U.S. PATENT DOCUMENTS 5,946,084 A  8/1999 Kubulins
5,978,435 A * 11/1999 Christensen ........... G06M 11/00
702/128

(Continued)

FOREIGN PATENT DOCUMENTS

JP   S63-50044 U    4/1988
JP   H01-282448 A   11/1989

(Continued)

OTHER PUBLICATIONS

Jul. 13, 2021 International Search Report issued in Patent Application No. PCT/JP2021/017903.

(Continued)

*Primary Examiner* — Hina F Ayub
(74) *Attorney, Agent, or Firm* — Oliff PLC

(57) ABSTRACT

A sensor for determining a liquid type, includes: a plano-convex lens; a lens holder configured to support the plano-convex lens via an edge of the lens; an outputting optical fiber that abuts against a plane surface of the plano-convex lens to output light; a light-receiving optical fiber that abuts against the plane surface of the plano-convex lens to receive light; a light-emitting unit connected to the outputting optical fiber; and a light amount measuring unit connected to the light-receiving optical fiber to measure a light amount. The outputting optical fiber is provided so that an end face of the outputting optical fiber is disposed on the edge of the plano-convex lens, and preferably, a central axis thereof at the end face thereof passes through the plane surface of the plano-convex lens.

20 Claims, 17 Drawing Sheets

(56) References Cited

U.S. PATENT DOCUMENTS

| | | | |
|---|---|---|---|
| 6,466,323 | B1 | 10/2002 | Anderson et al. |
| 2016/0150948 | A1* | 6/2016 | Shimamoto ........ A61B 1/00006 600/179 |

FOREIGN PATENT DOCUMENTS

| | | |
|---|---|---|
| JP | H07-092006 A | 4/1995 |
| JP | 2002-544473 A | 12/2002 |
| JP | 2006-515072 A | 5/2006 |
| JP | 2014-238333 A | 12/2014 |
| JP | 2016-170077 A | 9/2016 |
| JP | 2018-128277 A | 8/2018 |

OTHER PUBLICATIONS

Jul. 6, 2023 International Preliminary Report on Patentability issued in International Application No. PCT/JP2021/017903.

* cited by examiner

ENLARGED VIEW OF DISTAL END PORTION
OF SENSOR SURROUNDED BY BROKEN LINE

| PITCH (mm) | 2.5 | 4.0 | 4.2 | 4.4 | 4.5 | 4.6 | 4.8 | 5.0 |
|---|---|---|---|---|---|---|---|---|
| AREA RATIO (%)* | 100 | 100 | 95 | 84 | 79 | 73 | 61 | 48 |

\*: (AREA OF CORES IN ABUTMENT WITH PLANO-CONVEX LENS/
    CROSS-SECTIONAL AREA OF CORES) × 100

SENSOR FOR DETERMINING LIQUID TYPES

TECHNICAL FIELD

The present invention relates to a sensor for determining liquid types.

BACKGROUND ART

An apparatus, configured to bring a convex surface of a plano-convex lens into contact with a liquid in a chemical reaction tank, cause light to enter a plane surface of the plano-convex lens through an optical fiber, receive light totally-reflected repeatedly by the convex surface of the plano-convex lens and outputted from the plane surface of the plano-convex lens, analyze the wavelength of the received light to identify a wavelength absorbed by the total reflection, and use the identified wavelength to ascertain an extent of reaction in the chemical reaction tank, has been proposed as an apparatus capable of ascertaining an extent of a reaction in a chemical reaction tank (Patent Literature 1).

CITATION LIST

Patent Literature

Patent Literature 1: Japanese Patent Application Laid-Open No. 2014-238333

SUMMARY OF INVENTION

Technical Problem

When a liquid is the subject of analysis, the above-described apparatus can identify liquid types to some extent. In order to identify the liquid types, however, a spectroscopic analysis of light outputted from the plano-convex lens needs to be conducted.

In contrast to this, an object of the present invention is to allow for the identification of the liquid types more easily and with higher accuracy in an apparatus for identifying the liquid types with the use of total reflection at an interface between a plano-convex lens and the liquid.

Solution to Problem

With regard to a case where a liquid is brought into contact with a convex surface of a plano-convex lens, light is caused to enter a plane surface of the plano-convex lens through an outputting optical fiber, and light totally-reflected repeatedly by the convex surface of the plano-convex lens is received by a light-receiving optical fiber, the present inventor has found out the following. (a) The amount of the received light in the light-receiving optical fiber is less than that when no liquid is in contact with the convex surface of the plano-convex lens, and such a reduced amount is related to the refractive index and color of the liquid. Thus, liquid types can be identified easily without conducting a spectroscopic analysis by examining, in advance, a relationship between the color and refractive index of a liquid expected to be a subject to analysis and the amount of received light. Moreover, (b) the plano-convex lens can be easily held in a stable manner by providing an edge in the plano-convex lens. (c1) Disposing an end face, particularly a core, of the outputting optical fiber on the edge of the plano-convex lens enables the entire convex surface of the plano-convex lens to function as a sensing area (a region where total reflection is repeated), and thus accuracy in analyzing the liquid in contact with the convex surface is improved. (c2) In particular, when the central axis of the outputting optical fiber at the end face thereof passes through the plane surface of the plano-convex lens, the proportion of light in a direction perpendicular to the plane surface of the plano-convex lens can be increased among light having entered the plano-convex lens. This increases a difference between the amount of received light in the light-receiving optical fiber when a liquid is in contact with the convex surface of the plano-convex lens and the amount of received light in the light-receiving optical fiber when no liquid is in contact with the convex surface, thus improving accuracy in analyzing the liquid in contact with the convex surface. On the basis of these findings, the present inventor has achieved the present invention.

That is, the present invention provides a sensor for determining a liquid type, including: a plano-convex lens; a lens holder configured to support the plano-convex lens via an edge of the lens; an outputting optical fiber that abuts against a plane surface of the plano-convex lens to output light; a light-receiving optical fiber that abuts against the plane surface of the plano-convex lens to receive light; a light-emitting unit connected to the outputting optical fiber; and a light amount measuring unit connected to the light-receiving optical fiber to measure a light amount, in which the outputting optical fiber is provided so that an end face of the outputting optical fiber is disposed on the edge of the plano-convex lens.

The present invention also provides a sensor for determining a liquid type, including: a plano-convex lens; a lens holder configured to support the plano-convex lens via an edge of the lens; an outputting optical fiber that abuts against a plane surface of the plano-convex lens to output light; a light-receiving optical fiber that abuts against the plane surface of the plano-convex lens to receive light; a light-emitting unit connected to the outputting optical fiber; and a light amount measuring unit connected to the light-receiving optical fiber to measure a light amount, in which the outputting optical fiber is provided so that an end face of the outputting optical fiber is disposed on the edge of the plano-convex lens, and a central axis of the outputting optical fiber at the end face thereof passes through the plane surface of the plano-convex lens.

Advantageous Effects of Invention

According to the present invention, since the outputting optical fiber is provided so that the end face, particularly the core, of the outputting optical fiber is disposed on the edge of the plano-convex lens, the entire convex surface of the plano-convex lens is allowed to function as a sensing area, which is a region where total reflection is repeated. Thus, determination accuracy when determining liquid types in contact with the plano-convex lens can be improved on the basis of the amount of light totally-reflected repeatedly by the convex surface of the plano-convex lens and received by the light-receiving optical fiber.

Moreover, in a preferred embodiment of the present invention, the outputting optical fiber is provided so that the end face of the outputting optical fiber is disposed on the edge of the plano-convex lens, and the central axis of the outputting optical fiber at the end face thereof passes through the plane surface of the plano-convex lens. Thus, the proportion of high-intensity light in the direction of the central axis of the fiber can be increased among the light entering the plano-convex lens from the outputting optical fiber. Thus, determination accuracy when determining the liquid types in contact with the plano-convex lens can be improved on the basis of the amount of light totally-reflected repeatedly by the convex surface of the plano-convex lens and received by the light-receiving optical fiber.

Moreover, according to the present invention, liquid types can be determined on the basis of the amount of light received by the light-receiving optical fiber. Thus, the configuration of the apparatus can be simplified, and the cost of manufacturing the apparatus can be reduced. For example, the sensor for determining the liquid types according to the present invention can be produced with the production cost reduced to ⅕ or less as compared to conventional devices for determining the liquid types such as a charge coupled device (CCD) spectrophotometer, a process hydrometer with weights and a load cell, or the like.

DESCRIPTION OF EMBODIMENTS

Figure 1:
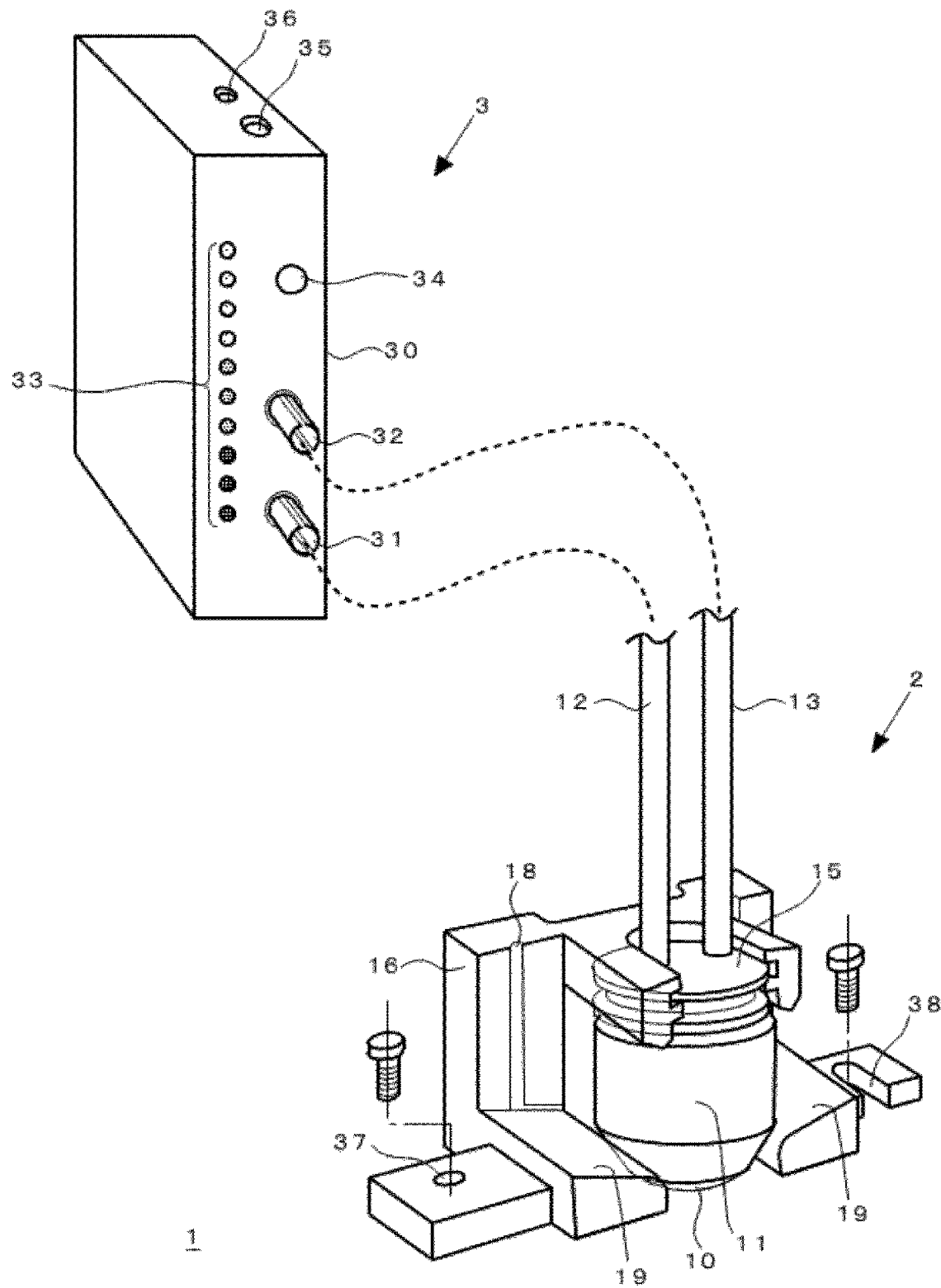
FIG. 1 is a schematic configuration view of a sensor for determining liquid types according to an embodiment.

The present invention will be described below in detail with reference to the drawings. Note that the same reference numerals denote the identical or equivalent components throughout the drawings.

General Configuration

Figure 2:
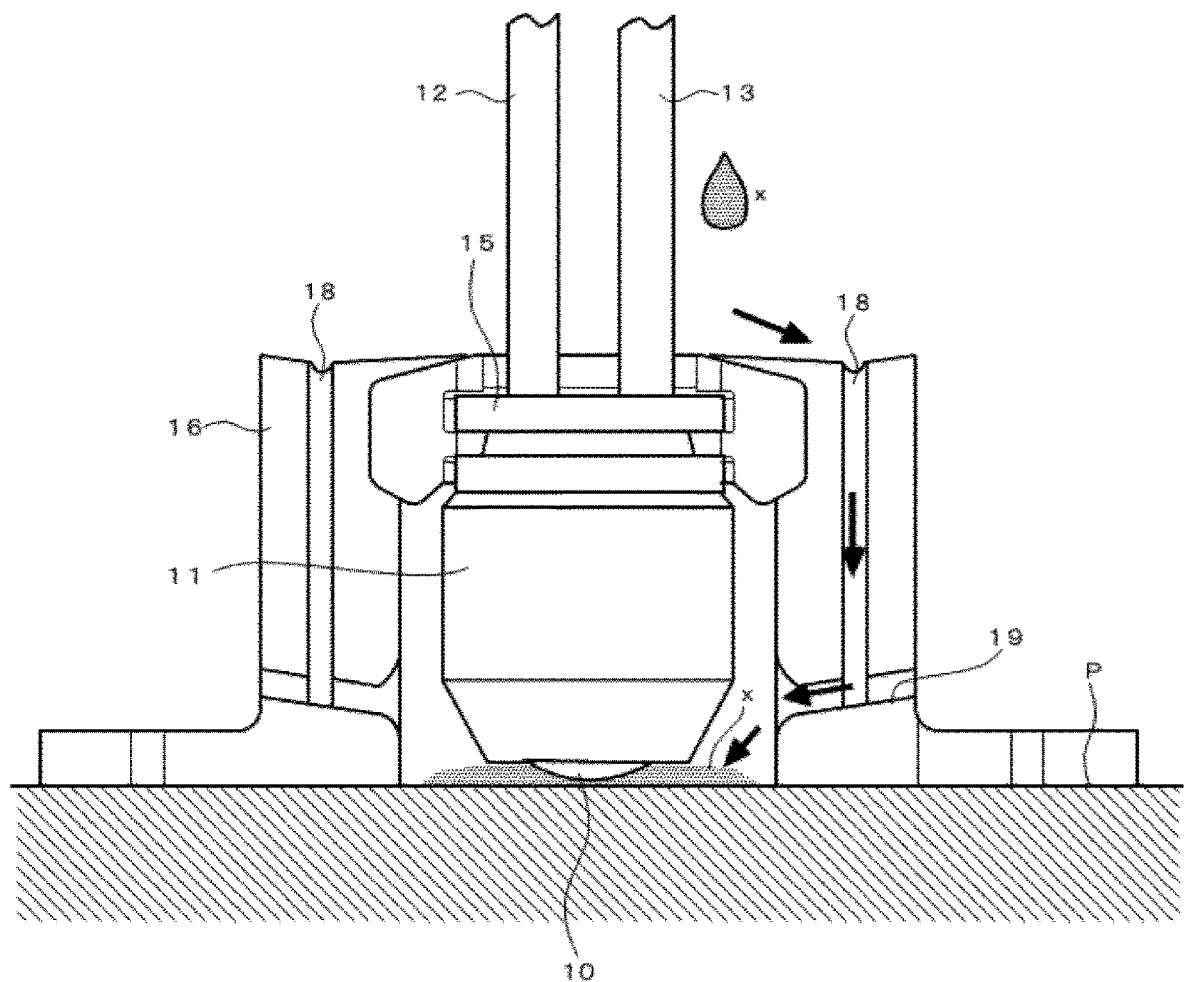
FIG. 2 is a front view of a detection unit in the sensor for determining liquid types according to the embodiment.

FIG. 1 is a schematic configuration view of a sensor 1 for determining liquid types according to an embodiment of the present invention. The sensor 1 for determining the liquid types includes: a detection unit 2 including a plano-convex lens to be brought into contact with a liquid to be detected or determined; and a control unit 3. FIG. 2 is a front view of the detection unit 2, FIGS. 3A to 3D are cross-sectional views of the detection unit 2, and FIG. 4 is an exploded view of the detection unit 2.

The detection unit 2 includes: a plano-convex lens 10; a lens holder 11 configured to support the plano-convex lens 10 via an edge 10a of the lens; an outputting optical fiber 12 that abuts against a plane surface 10b of the plano-convex lens to output light; and a light-receiving optical fiber 13 that abuts against the plane surface 10b of the plano-convex lens to receive light (FIGS. 3A to 3D). The control unit 3, on the other hand, includes: an outputting optical connector 31 to be connected to the outputting optical fiber 12; a light-emitting unit connected to the connector 31; a light-receiving optical connector 32 to be connected to the light-receiving optical fiber 13; a light amount measuring unit connected to the connector 32 to measure the amount of light received by the light-receiving optical fiber 13; and a level display unit 33 for the measured light amount, for example (FIG. 1).

Figure 3A:
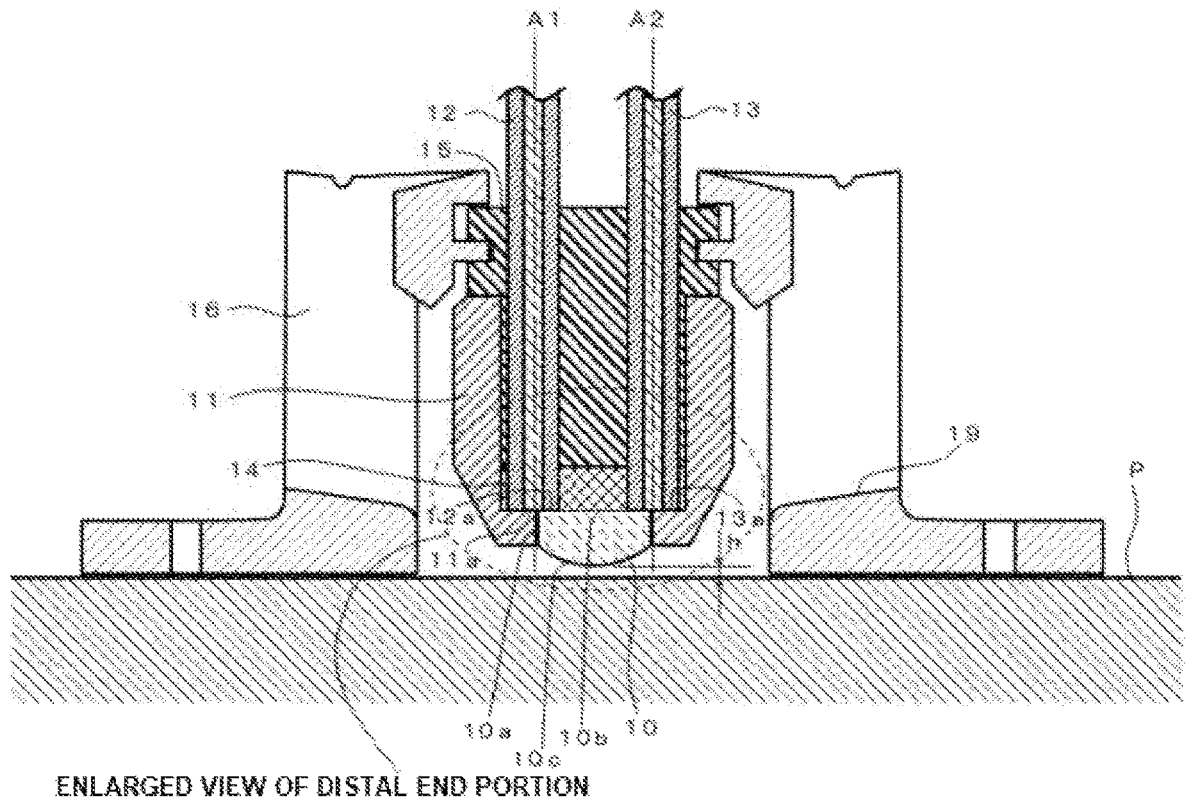
FIG. 3A is a cross-sectional view of the detection unit in the sensor for determining liquid types according to the embodiment.
Figure 3A:
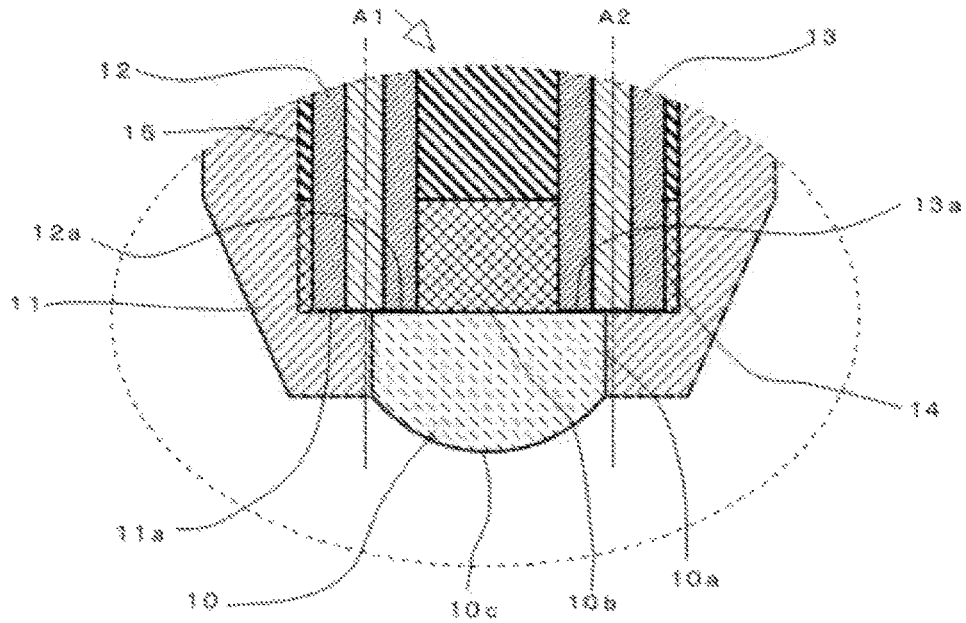
Figure 4:
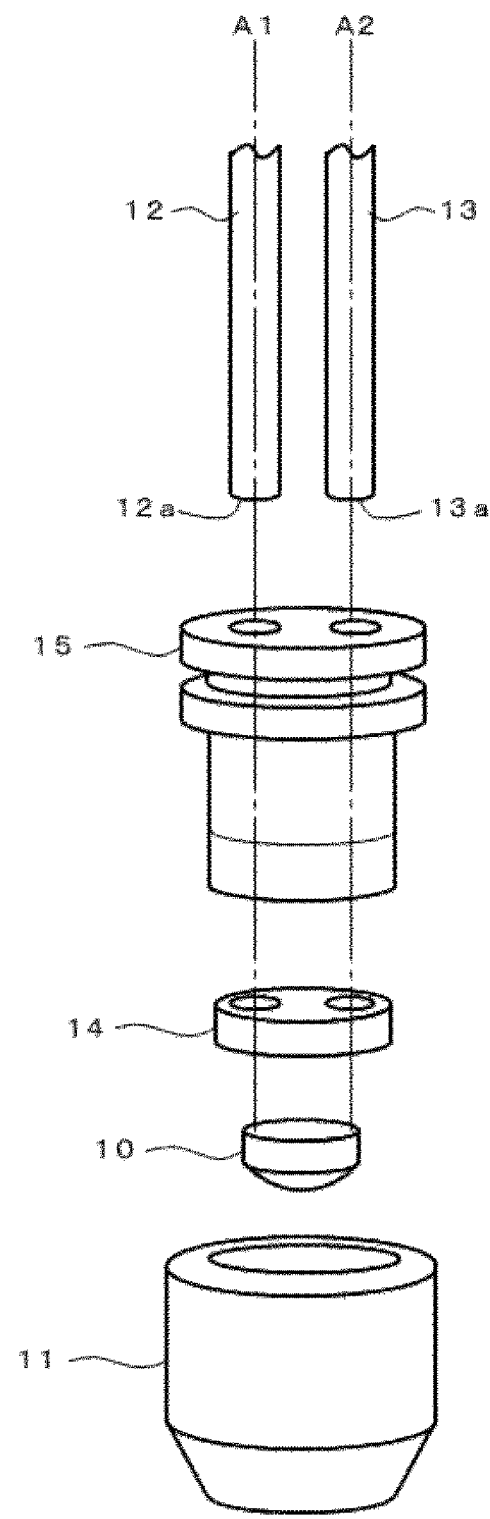
FIG. 4 is an exploded view of the detection unit in the sensor for determining liquid types according to the embodiment.

Detection Unit:

In the detection unit 2 as shown in FIG. 3A, for example, the lens holder 11 is made of a chemical-resistant resin and formed in a cylindrical shape with a bottom including an opening. The plano-convex lens 10 is fitted into the opening, and the whole circumference of an inner wall of the opening is pressed against the whole circumference of the edge 10a. Supporting the plano-convex lens 10 by the lens holder 11 via the edge 10a as just described stabilizes the state in which the plano-convex lens 10 is supported in the lens holder 11. This allows the lens holder 11 and the plano-convex lens 10 to maintain a state of intimate contact therebetween. Moreover, airtightness in the lens holder 11 is increased, thereby making it possible to ensure water-proof and dust-proof properties. Thus, the detection unit 2 can be suitable for outside installation as well. In addition, the plano-convex lens 10 and the lens holder 11 create a state of vacuum contact. Thus, the plano-convex lens 10 is fixed simply by being fitted into the lens holder 11, and the plano-convex lens 10 becomes less likely to be detached. Light having entered the plano-convex lens 10 from a core of the outputting optical fiber 12 can be totally-reflected efficiently at an interface between the edge 10a of the plano-convex lens 10 and the lens holder 11 by setting the refractive index of the lens holder 11 so as to be identical to the refractive index of the cladding of the outputting optical fiber 12.

A fluorine-based resin such as perfluoroalkoxy alkane (PFA) or polytetrafluoroethylene (PTFE), or a chemical-resistant resin such as polypropylene (PP) or polyethylene (PE) is preferably used as a material for forming the lens holder 11. A lens made of synthetic silica, a synthetic resin, or high refractive index glass, for example, and having a radius of curvature of 3 to 4 mm, a lens diameter of 4 to 6 mm, and an edge thickness of 1 to 3 mm can be used as the plano-convex lens 10.

In the lens holder 11, a light-shielding part 14 is provided on the plano-convex lens 10 supported by the lens holder 11, and a bush 15 made of a chemical-resistant resin, as with the lens holder 11, is provided on the light-shielding part 14. A portion of an inner surface of the lens holder 11 surrounding the plano-convex lens 10 is a surface 11a flush with the plane surface 10b of the plano-convex lens 10.

Figure 3B:
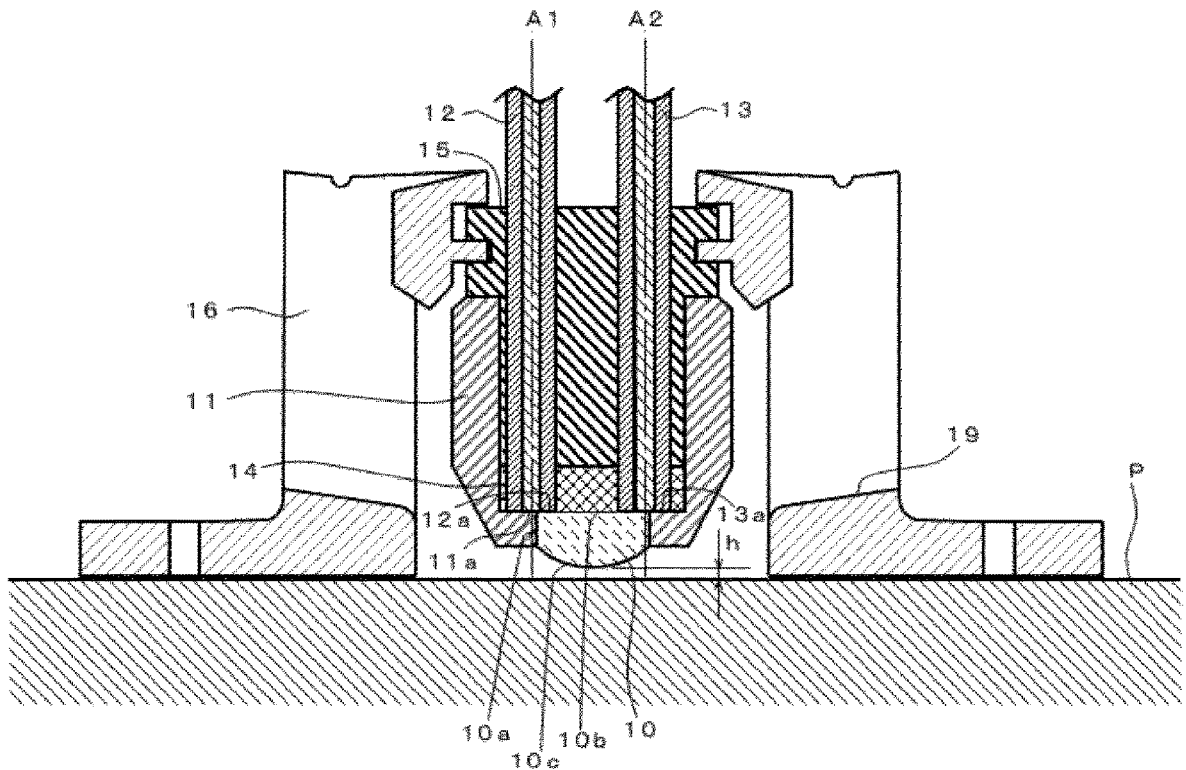
FIG. 3B is a cross-sectional view of the detection unit in the sensor for determining liquid types according to the embodiment.
Figure 3C:
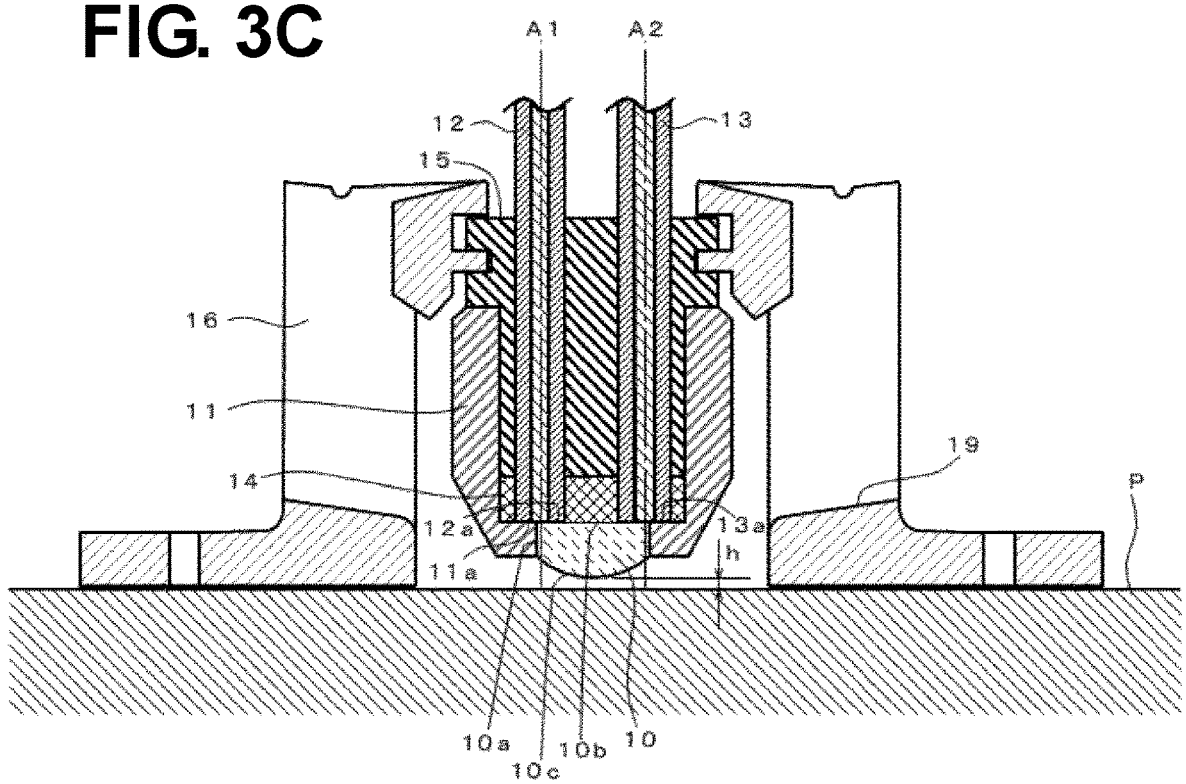
FIG. 3C is a cross-sectional view of the detection unit in the sensor for determining liquid types according to the embodiment.

The outputting optical fiber 12 is pressed into the bush 15, and runs through the light-shielding part 14, so that an end face 12a of the outputting optical fiber 12 abuts against the plane surface 10b of the plano-convex lens and the inner surface 11a of the lens holder 11. At this time, the end face 12a, particularly the core, is positioned on the edge 10a of the plano-convex lens (FIGS. 3A to 3C). Although a central axis A1 of the outputting optical fiber 12 at the end face 12a may be shifted from the edge 10a toward the lens holder 11 (FIGS. 3A and 3B), the central axis A1 preferably passes through the plane surface 10b of the plano-convex lens (FIG. 3C).

The light-receiving optical fiber 13 is also pressed into the bush 15, and runs through the light-shielding part 14, so that an end face 13a of the light-receiving optical fiber 13 abuts against the plane surface 10b of the plano-convex lens and the inner surface 11a of the lens holder 11. At this time, the end face 13a, particularly a core, is positioned on the edge 10a of the plano-convex lens (FIGS. 3A to 3C). Although a central axis A2 of the light-receiving optical fiber 13 at the end face 13a may be shifted from the edge 10a toward the lens holder 11 (FIG. 3A), or the central axis A2 may pass through the plane surface 10b of the plano-convex lens (FIGS. 3B and 3C). The end face 13a of the light-receiving optical fiber 13 is preferably provided at a position symmetric to the end face 12a of the outputting optical fiber 12 with the center of the plane surface 10b of the plano-convex lens 10 serving as a point of symmetry (FIGS. 3A and 3C).

Figure 5A:
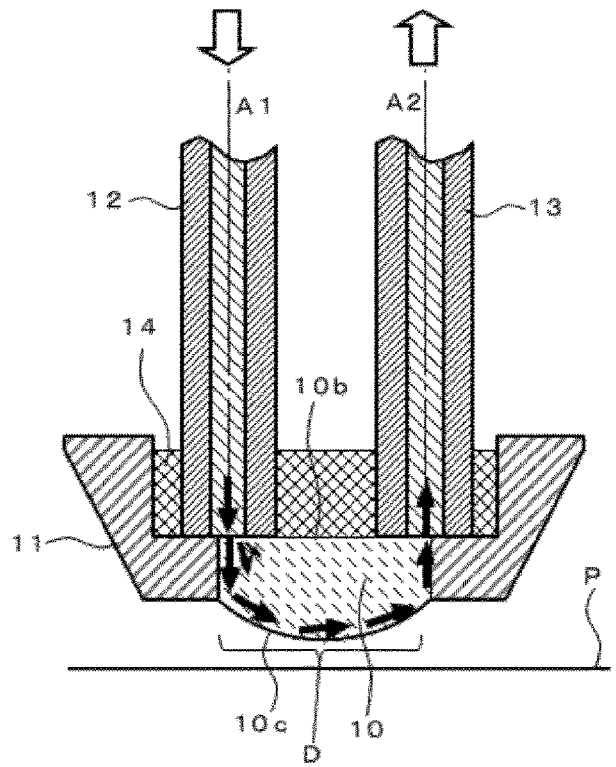
FIG. 5A is a diagram for explaining the propagation of light having entered a plano-convex lens from an outputting optical fiber when the plano-convex lens is not in contact with any liquid.

As a result of providing the outputting optical fiber 12 and the light-receiving optical fiber 13 at the above-described positions, light entering the plano-convex lens 10 from the outputting optical fiber 12 in the detection unit 2 has an increased proportion of high-intensity light in the direction of the central axis A1 as shown in FIG. 5A. Furthermore, the entire diameter of a convex surface 10c of the plano-convex lens can be utilized widely as a sensing area D where light outputted from the outputting optical fiber 12 is totally-reflected repeatedly by the convex surface 10c.

Figure 5B:
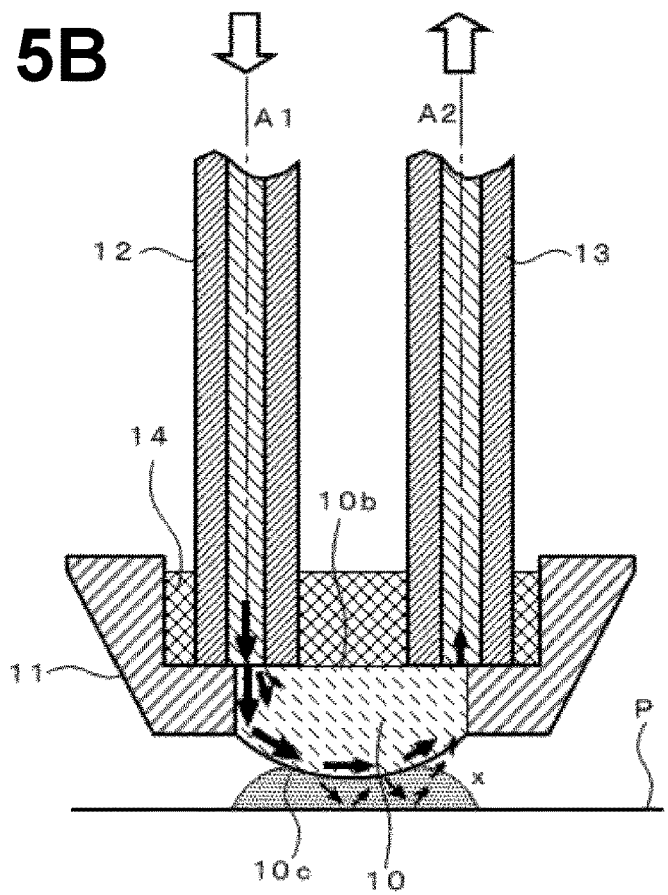
FIG. 5B is a diagram for explaining the propagation of light having entered a plano-convex lens from an outputting optical fiber when the plano-convex lens is in contact with a liquid.

When the convex surface 10c of the plano-convex lens 10 comes into contact with a liquid x as shown in FIG. 5B, light having entered from the outputting optical fiber 12 is totally-reflected repeatedly by the convex surface 10c or reflected by an installation surface P of the detection unit 2, and then received by the light-receiving optical fiber 13. The amount of such received light is smaller than that when the convex surface 10c of the plano-convex lens 10 is not in contact with the liquid x. Since the reduced amount is dependent on the refractive index and color of the liquid x, liquid types can be determined on the basis of the amount of the received light. Thus, accuracy in determining the liquid types can be improved by increasing the sensing area D in the convex surface 10c of the plano-convex lens 10 and increasing the proportion of high-intensity light in the direction of the central axis A1 of the outputting optical fiber 12 among the light entering the plano-convex lens 10 as described above.

Figure 6:
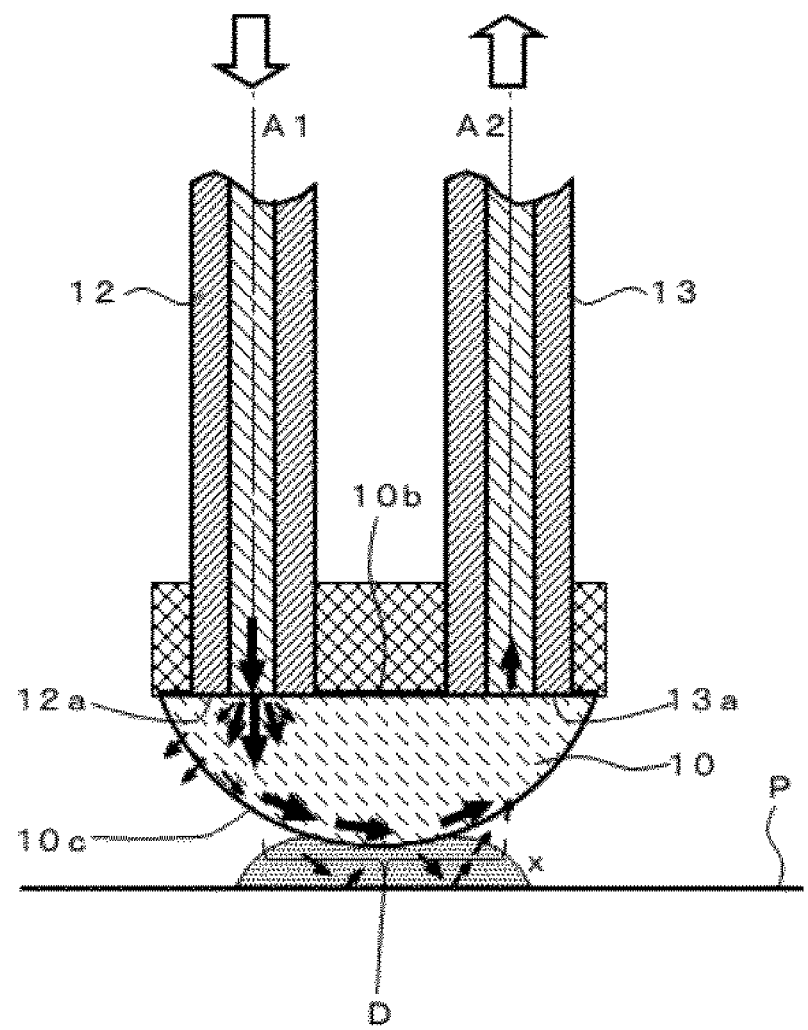
FIG. 6 is a diagram for explaining the propagation of light having entered a plano-convex lens from an outputting optical fiber when the plano-convex lens in a detection unit according to a comparative example is in contact with a liquid.

In contrast to this, if the end face 12a of the outputting optical fiber 12 and the end face 13a of the light-receiving optical fiber 13 are each disposed completely within the plane surface 10b of the plano-convex lens 10 as shown in FIG. 6, variations in the intensity and direction of light entering the plano-convex lens 10 become greater and the sensing area D becomes smaller. Thus, accuracy in determining the liquid types x is lowered.

The bush 15 fitted into the lens holder 11, on the other hand, is engaged with a bracket 16 made of a chemical-resistant resin such as polyvinyl chloride (PVC), a polyether ether ketone resin (PEEK), polytetrafluoroethylene (PTFE), perfluoroalkoxy alkane (PFA), polypropylene (PP), or polyethylene (PE) (FIGS. 3A to 3C). It is preferable that a distance h between the convex surface 10c of the plano-convex lens 10 and the installation surface P of the detection unit 2 that is opposed to the convex surface 10c be maintained within a range of 0.4 to 0.6 mm by such engagement. Having such a distance h facilitates the permeation of the liquid into an area between the convex surface 10c of the plano-convex lens 10 and the installation surface P of the detection unit 2, and thus the wetting of the convex surface 10c of the plano-convex lens 10 by the liquid. If the distance h is too large, on the other hand, the amount of liquid necessary to be kept between the convex surface 10c and the installation surface P in order to wet the sensing area D of the plano-convex lens 10 with the liquid x is undesirably increased. Conversely, if the distance h is too small, setting of the tolerance for assembly becomes difficult.

Figure 3D:
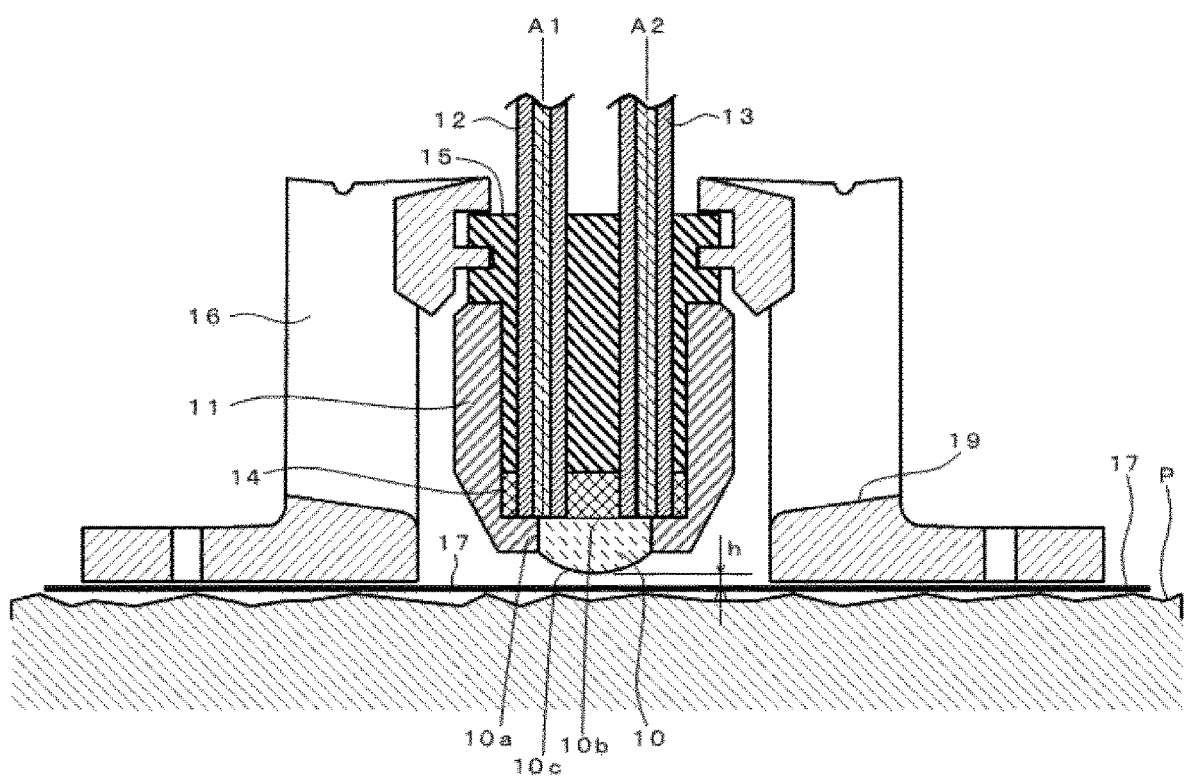
FIG. 3D is a cross-sectional view of the detection unit in the sensor for determining liquid types according to the embodiment, which is provided with a reflector.

If light reflected by the installation surface P, of the light outputted from the outputting optical fiber 12, is less likely to be received by the light-receiving optical fiber 13 due to the presence of irregularities in the installation surface P of the detection unit 2, or if there is a possibility of damaging the convex surface 10c of the plano-convex lens 10 upon installation of the detection unit 2 due to the installation surface P being made of stone or concrete, for example, a reflector 17 may be provided on the installation surface P of the detection unit 2 so as to be opposed to the convex surface 10c of the plano-convex lens 10 as shown in FIG. 3D. In this case, it is preferable that the above-described distance h be maintained between the convex surface 10c of the plano-convex lens 10 and the reflector 17.

The bracket 16 is provided with a hole portion 37 and a cutout portion 38 so that the detection unit 2 can be fixed at a predetermined installation location via screws, for example (FIG. 1). The bracket 16 is also provided with a channel 18 and a slant surface 19 for guiding a liquid falling onto an upper surface of the bracket 16 to an area under the convex surface 10c of the plano-convex lens 10 (FIG. 2). Thus, even when a very small amount of a liquid falls onto the installation place of the detection unit 2, the liquid types can be determined.

In this detection unit 2, the optical fibers 12 and 13 and the plano-convex lens 10 are used to determine liquid types as described above. Thus, the detection unit 2 can be used safely even when a liquid to be determined is an inflammable substance such as gasoline and thus possess danger of ignition, or even when the installation location of the detection unit 2 is in an explosion-proof area.

Control Unit:

The control unit 3 includes, on a surface of its housing 30, the outputting optical connector 31 to be connected to the outputting optical fiber 12, and the light-receiving optical connector 32 to be connected to the light-receiving optical fiber 13. The outputting optical connector 31 is connected to the light-emitting unit built into the housing 30, and the light-receiving optical connector 32 is connected to the light amount measuring unit built into the housing 30 (FIG. 1).

The light-emitting unit is constituted by a light-emitting diode (hereinafter, referred to as LED) light source, for example, and sends light with a predetermined wavelength to the outputting optical connector 31. A commercially-available LED light or an optical fiber amplifier, for example, may be used as the light-emitting unit. The wavelength of light to be sent to the outputting optical connector 31 may be variable. Suppose a case where red light is used as light to be sent to the outputting optical connector 31. If the liquid in contact with the plano-convex lens 10 is a blue-based liquid that is more likely to absorb red light, red light is more likely to be absorbed by the liquid during a period between when the red light is outputted to the plano-convex lens 10 and when the red light is received by the light-receiving optical fiber 13. Thus, a reduction in the amount of received light becomes large as a result of the plano-convex lens 10 and the liquid being in contact with each other, thereby improving accuracy in determining the liquid types. Moreover, since red light is visible light, the light being outputted to the plano-convex lens 10 is visible to the naked eyes. Also from the perspective that red is generally recognized as a color indicating danger, red light is preferably used. Note that ultraviolet light is undesirable to use since ultraviolet light deteriorates the resin that forms the lens holder 11. Also from the perspective that the light shielding of the detection unit is required due to a possibility that sunlight is falsely detected if the detection unit 2 is installed outside, ultraviolet light is undesirable to use.

Figure 7A:
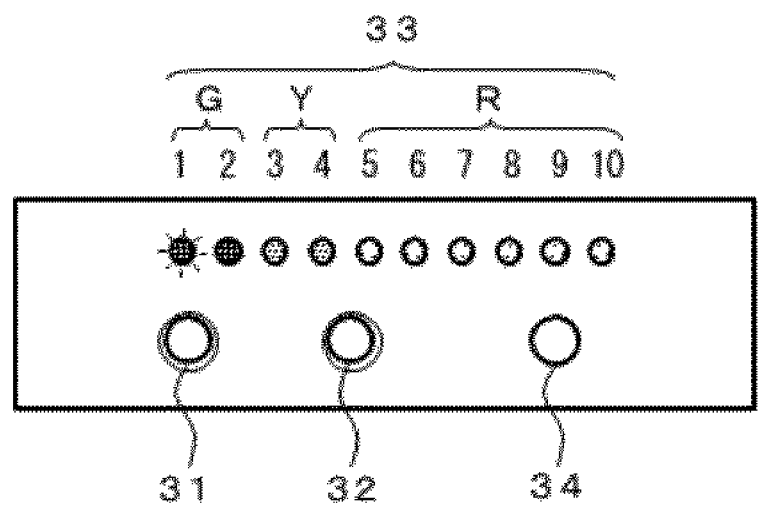
FIG. 7A is a diagram for explaining a lighting state of a level display unit and a warning lamp.
Figure 7B:
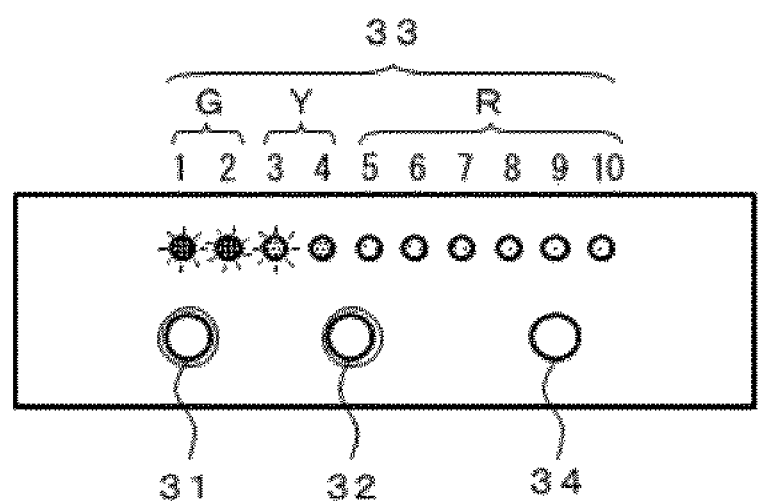
FIG. 7B is a diagram for explaining a lighting state of the level display unit and the warning lamp.
Figure 7C:
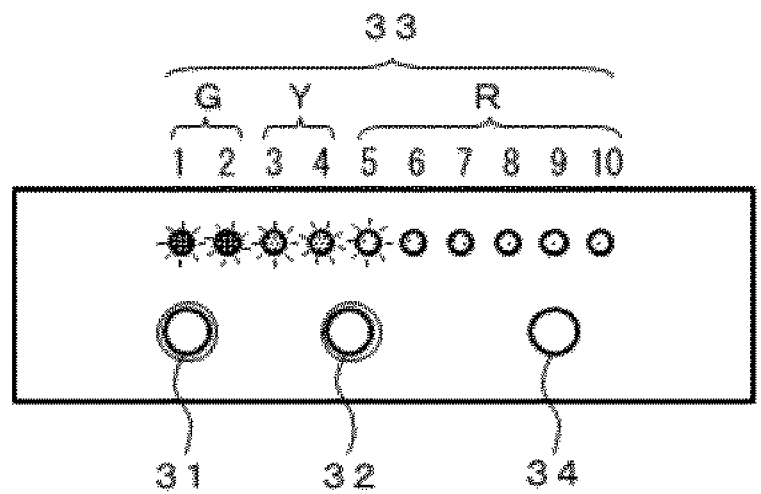
FIG. 7C is a diagram for explaining a lighting state of the level display unit and the warning lamp.
Figure 7D:
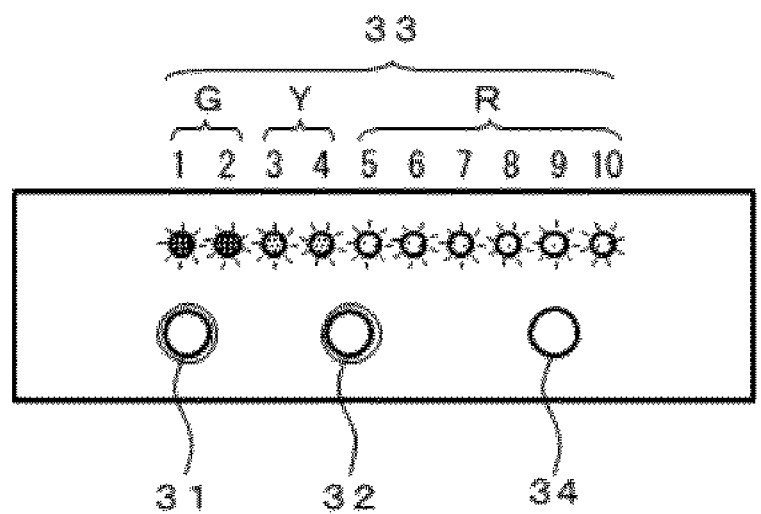
FIG. 7D is a diagram for explaining a lighting state of the level display unit and the warning lamp.

The light amount measuring unit, on the other hand, is constituted by a light-receiving element such as a photodiode. The light amount measuring unit measures a voltage as the amount of light received by the light-receiving optical fiber 13. The control unit 3 includes, on the surface of the housing 30, the level display unit 33 configured to indicate a level for the amount of received light, a warning lamp 34, a rotary DIP switch 35 for threshold setting, and a trimmer 36 for sensitivity adjustment. In the level display unit 33, a plurality of LED lamps are arranged, and a corresponding number of LED lamps are turned on in accordance with the light amount measured by the light amount measuring unit. Those having different emission colors are preferably used as the LED lamps. When the light amount measured by the light amount measuring unit corresponds to a state when the plano-convex lens 10 is not in contact with any liquid, for example, a part of green lamps G is turned on and the other lamps are turned off as shown in FIG. 7A. When the light amount measured by the light amount measuring unit corresponds to a state when the plano-convex lens 10 is in contact with water, the green lamps G and a part of yellow lamps Y are turned on and the other lamps are turned off as shown in FIG. 7B. Similarly, when the light amount corresponds to a state when the plano-convex lens 10 is in contact with a predetermined first liquid (e.g., ethyl alcohol), the green lamps G, the yellow lamps Y, and a part of red lamps R are turned on and the other lamps are turned off as shown in FIG. 7C. Similarly, when the light amount corresponds to a state when the plano-convex lens 10 is in contact with a predetermined second liquid (e.g., isopropyl alcohol), the green lamps G, the yellow lamps Y, and the red lamps R are turned on as shown in FIG. 7D.

The warning lamp 34 may be turned on as needed. The warning lamp 34 may also be constituted by LED lamps having different emission colors. On the basis of the warning level, the color of the lamp to be turned on may be changed from green to yellow or red, for example. Furthermore, if the detected liquid indicates a possibility of abnormal liquid leakage at the installation place of the detection unit 2, a warning signal may be transmitted to a management system at the installation place.

Figure 8:
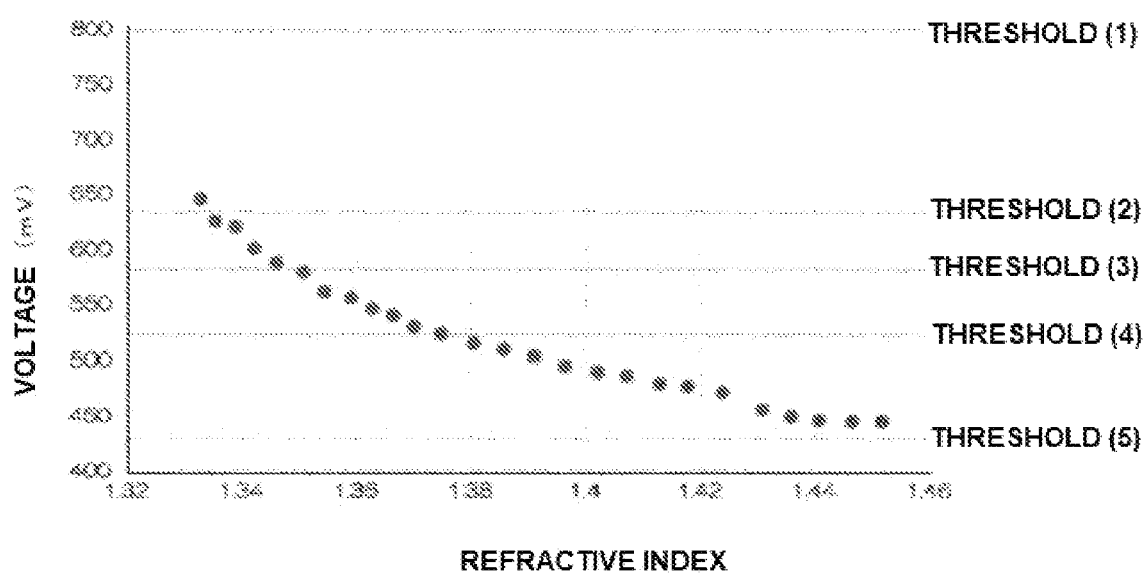
FIG. 8 is a diagram showing a relationship between a detected voltage corresponding to the amount of received light and the refractive index of a liquid.
Figure 9:
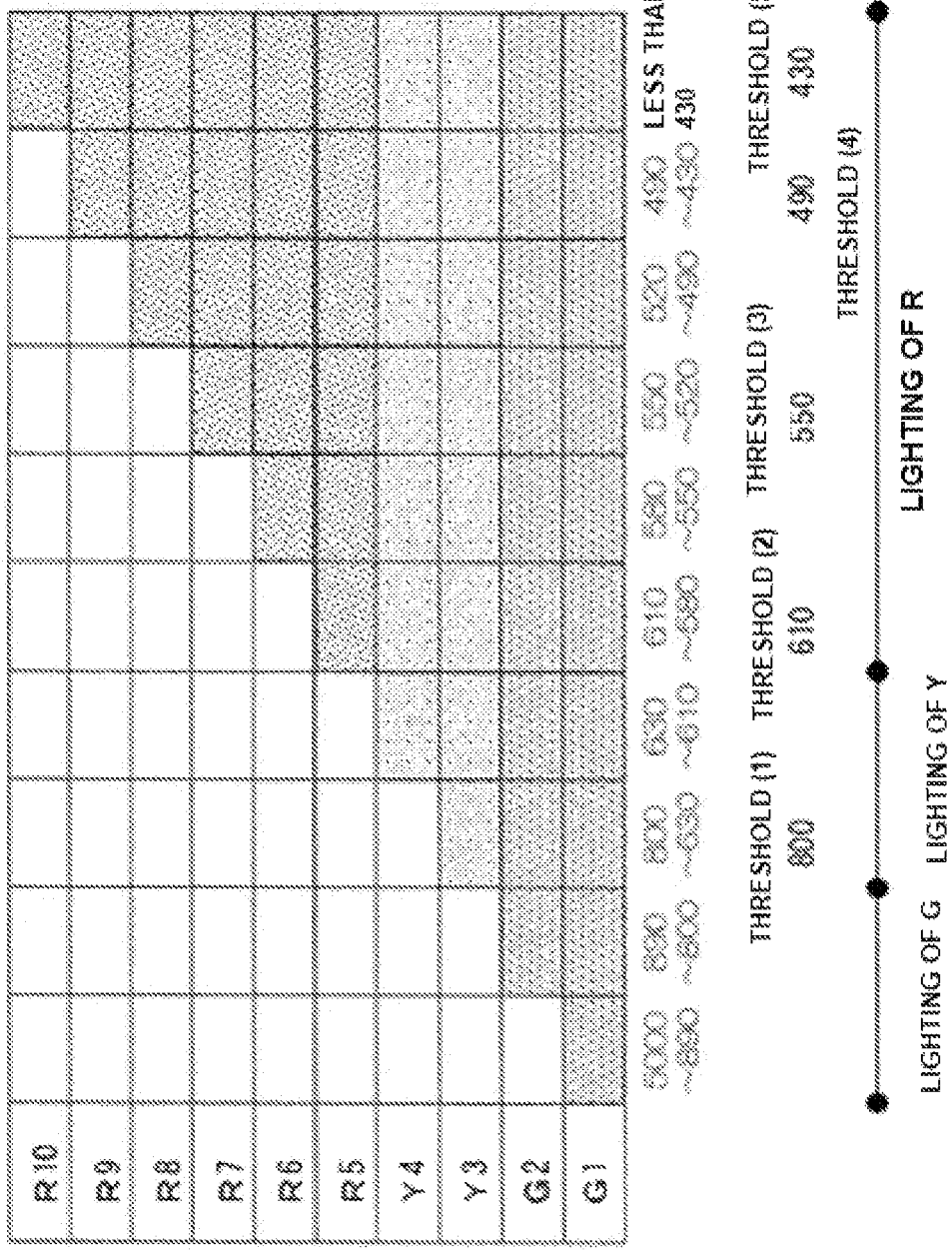
FIG. 9 shows an example of threshold setting for lamps of the level display unit and the warning lamp.

With regard to how the LED lamps in the level display unit 33 and the warning lamp 34 are turned on in accordance with the amount of received light, relationships between voltages measured by the light amount measuring unit and the refractive indexes of liquids are observed in advance, for example, using refractive index reference solutions (hereinafter, referred to as reference solutions) which are sucrose aqueous solutions having various concentrations, and following this, thresholds to turn on the respective LED lamps may then be set. If the refractive indexes of the reference solutions and the voltages measured by the light amount measuring unit have relationships shown in FIG. 8, for example, voltage thresholds (1) to (5) which corresponds to the turning on of the green lamps G, the yellow lamps Y, and the red lamps R in the level display unit 33, as well as the yellow lamp Y and the red lamp R in the warning lamp 34 are set. When a detected voltage is smaller than a threshold, corresponding lamps are turned on as shown in FIG. 9. Preferably, the thresholds (1) to (5) can be changed as necessary. In the present embodiment, the threshold (1) is set to 800 mV so as to correspond to the state when the plano-convex lens 10 is in contact with water. If a detected voltage exceeds 800 mV, a green lamp G1 or G2 is turned on in the level display unit 33. If a detected voltage becomes smaller than or equal to 800 mV, a yellow lamp Y3 is turned on in addition to the green lamps G1 and G2, and the warning lamp 34 is also turned on in yellow. The thresholds (2) to (5) are set to the thresholds shown in FIG. 9. If a detected voltage becomes smaller than or equal to 610 mV, for example, a red lamp R5 is turned on in addition to the green lamps G1 and G2, and the yellow lamps Y3 and Y4, and the warning lamp 34 is also turned on in red. The thresholds (2) to (5) can be changed with the rotary DIP switch 35 for threshold setting.

Although liquid types in contact with the plano-convex lens 10 cannot be determined only with a relationship between a voltage corresponding to the amount of received light and a refractive index, the liquid types detected at respective locations where the detection unit 2 is installed are limited. Thus, a threshold to turn on the warning lamp 34 is preferably set in accordance with the liquid types to be detected for each location where the detection unit 2 is installed. If the detection unit 2 is installed near a joint of an exterior gasoline pipe, for example, liquids to be determined are gasoline and rain water. Since the refractive indexes of gasoline and rain water differ from each other, it is possible to determine if the detected liquid is rain water, gasoline, or a mixture of these liquids. If it is detected that the liquid is gasoline or a gasoline mixture, liquid leakage in the joint is revealed as an issue. Thus, the warning lamp 34 is turned on, and a warning signal is transmitted.

Note that the method of displaying measurement results made by the light amount measuring unit in the present invention is not limited to the method of indicating a light amount with the use of the emission colors of the LED lamps and the number of emitting LED lamps. For example, measurement results may be numerically displayed.

Use Applications:

Liquid Leakage Sensor

Figure 10A:
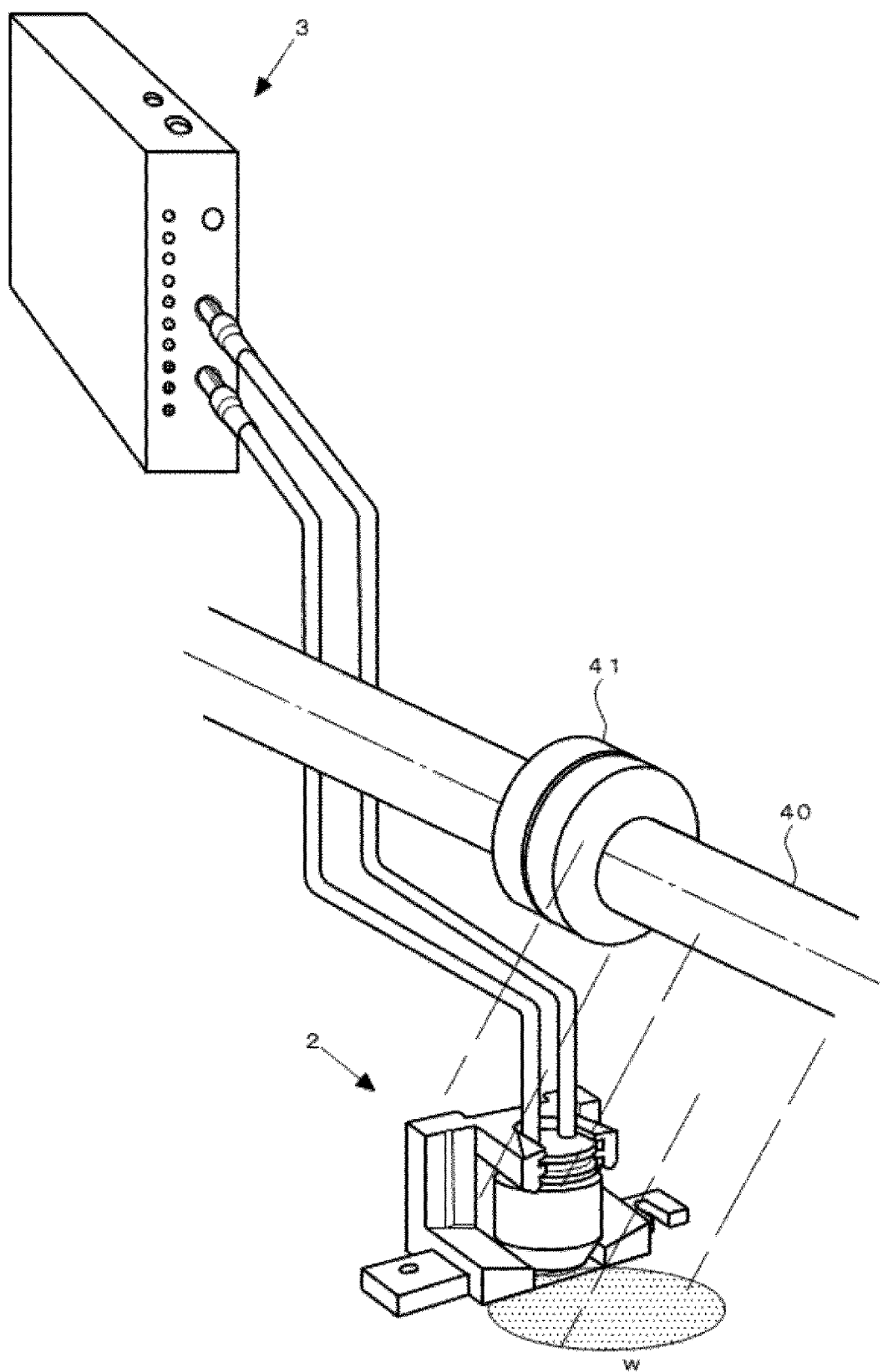
FIG. 10A is a diagram for explaining a use application of the sensor for determining liquid types as a liquid leakage sensor.
Figure 10B:
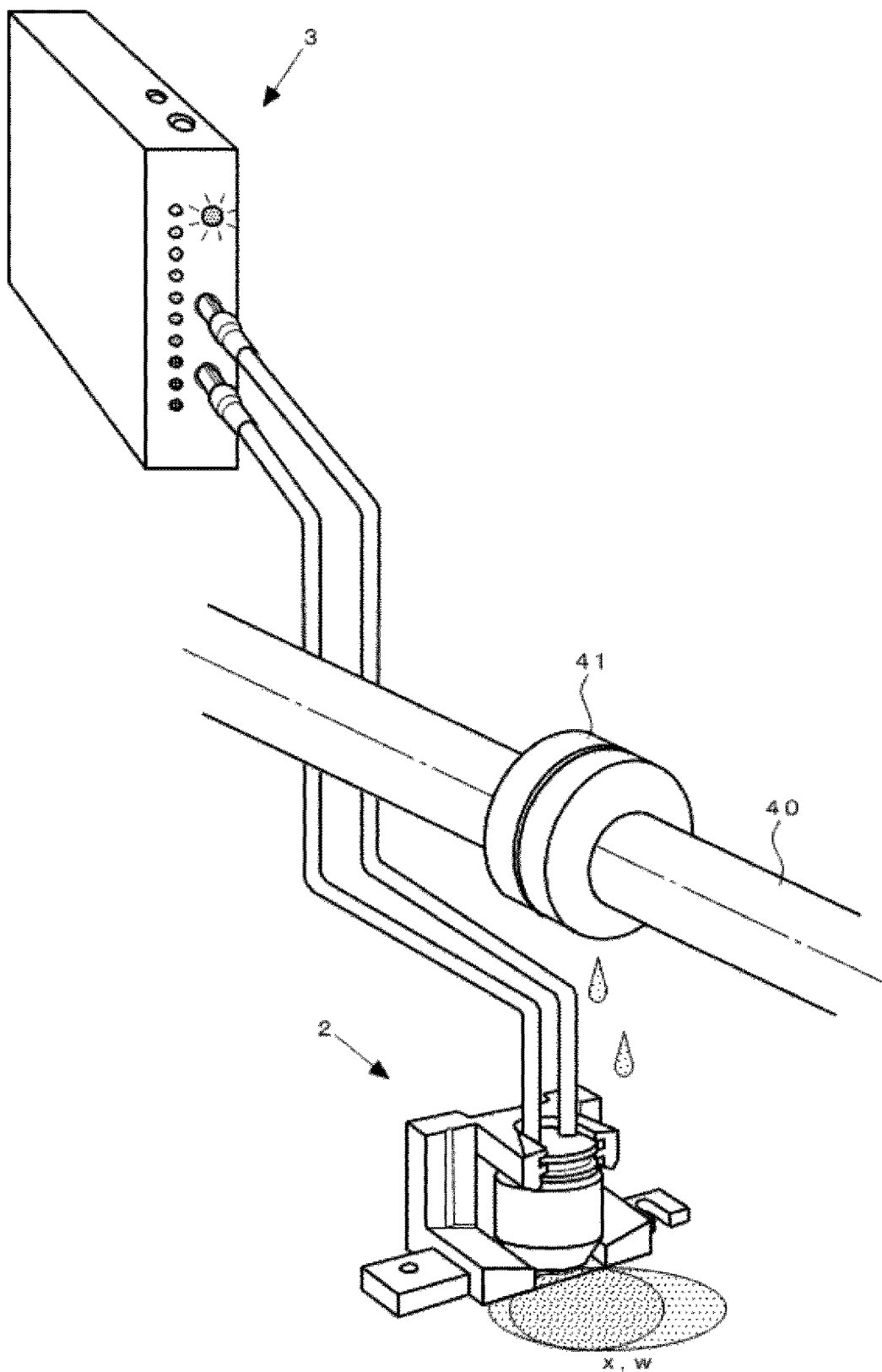
FIG. 10B is a diagram for explaining a use application of the sensor for determining liquid types as a liquid leakage sensor.

The sensor for determining liquid types according to the present invention can be used as a liquid leakage sensor to be installed for detecting the presence or absence of liquid leakage at a place with a risk of liquid leakage. In this case, the sensor for determining liquid types can constantly detect a predetermined liquid type whose leakage is problematic, rather than a simple liquid detection. As shown in FIG. 10A, for example, the detection unit 2 is installed under a joint portion 41 of a pipe 40 installed outdoors, and the refractive index of the liquid passing through the pipe 40 is examined in advance. Accordingly, when the detection unit 2 is in contact with rain water w, the yellow lamp can be turned on in the warning lamp 34. If the detection unit 2 is in contact with a liquid x which leaked from the joint portion 41 as shown in FIG. 10B, the red lamp can be turned on in the warning lamp 34 even when the leaked liquid is diluted by rain water w. Furthermore, the sensor for determining the liquid types can constantly monitor the presence or absence of the liquid leakage on an around-the-clock basis via the function of transmitting warning on abnormal liquid leakage. Similarly, the sensor for determining the liquid types can also constantly monitor liquid leakage due to the aging deterioration or corrosion of a pipe, or liquid leakage from various devices. In this case, even when the liquid whose leakage is problematic is acid, alkaline, or corrosive, forming the lens holder 11 and the bush 15 with a chemical-resistant resin enables the detection unit 2 to be brought into contact with the leaked liquid.

Sensor for Determining a Liquid type in Piping

Figure 11:
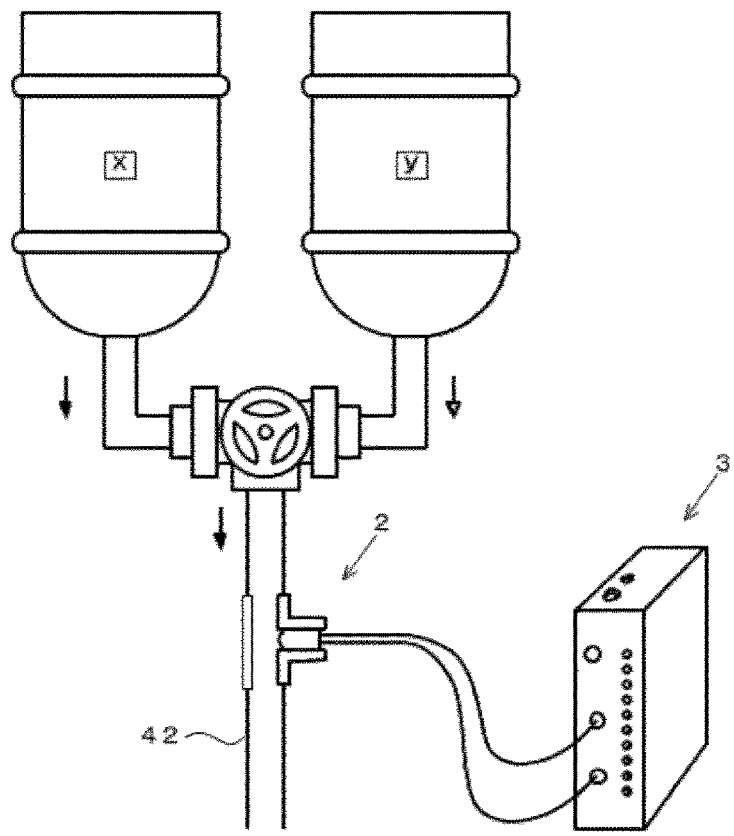
FIG. 11 is a diagram for explaining a use application of the sensor for determining liquid types as a sensor for determining liquid types in a pipe.

As shown in FIG. 11, by installing the detection unit 2 in a pipe 42 through which one of different liquids x or y is passing, the sensor for determining the liquid types can determine which of the liquids x or y is flowing in the pipe 42 at the installation place of the detection unit 2.

Liquid Level Sensor

Figure 12:
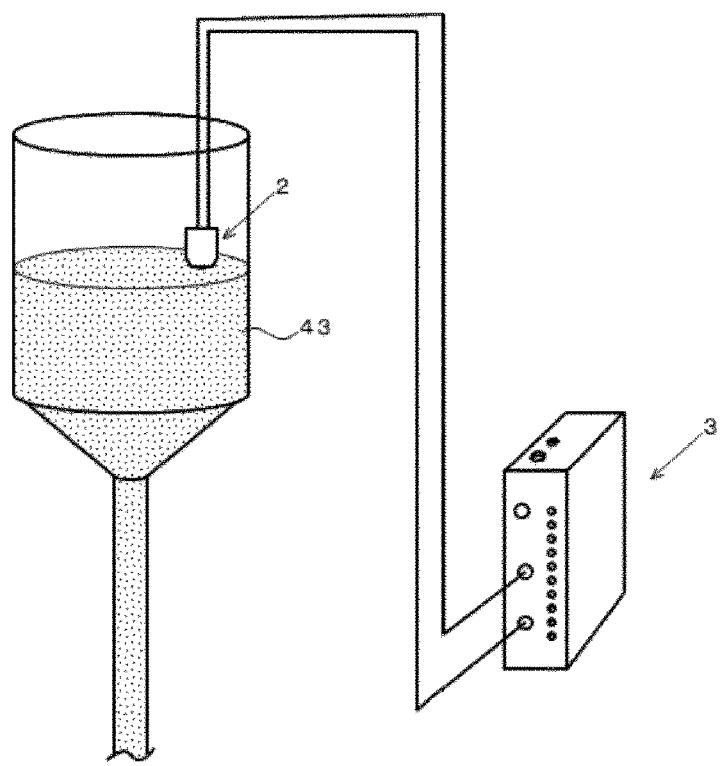
FIG. 12 is a diagram for explaining a use application of the sensor for determining liquid types as a liquid level sensor.

As shown in FIG. 12, by installing the detection unit 2 at the height of a predetermined liquid level in a liquid tank 43, the sensor for determining the liquid types can be used as a liquid level sensor in the liquid tank 43. If the liquid tank 43 is used as a reaction tank in which liquids make predetermined reactions, the detection unit 2 attached to such a liquid tank 43 can be used for checking the progress of the reaction proceeding in the tank.

Tank Interior Management Sensor

Figure 13:
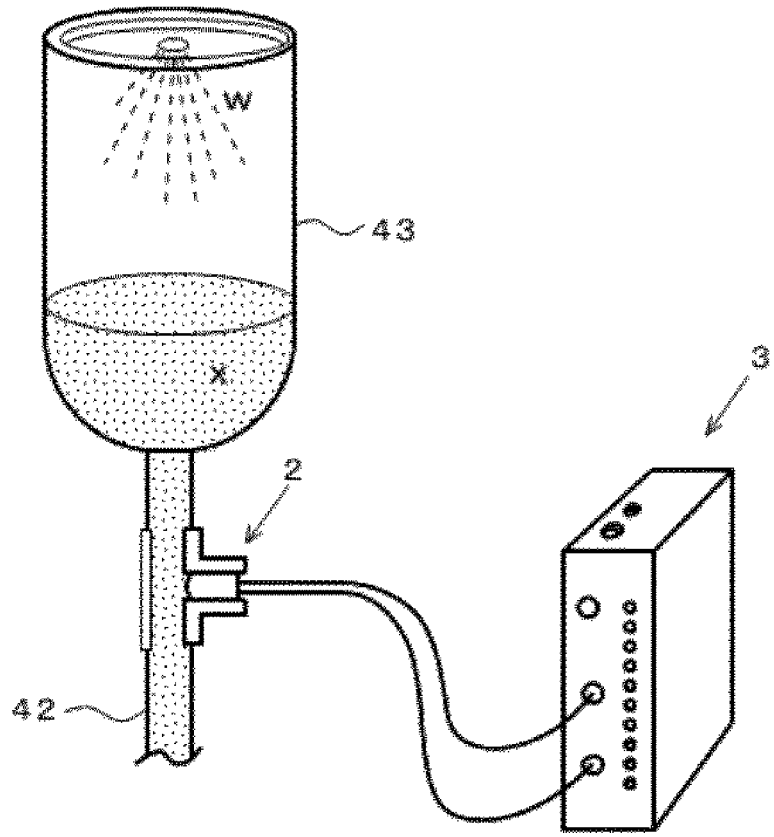
FIG. 13 is a diagram for explaining a use application of the sensor for determining liquid types as a tank interior management sensor.

As shown in FIG. 13, by installing the detection unit 2 in a pipe 42 used when a liquid tank 43 retaining a chemical solution x is washed with water w, the sensor for determining liquid types can be used as a tank interior management sensor that discriminates between a state in which the chemical solution x is remaining in the liquid tank 43 and a state in which the washing is completed and only water w is present in the liquid tank 43. This can eliminate the repetition of unnecessary washing, and thus the interior of the tank can be efficiently washed. In addition to these, the sensor for determining the liquid types according to the present invention can be used in various situations.

EXAMPLE

The present invention will be specifically described below with reference to Example.

Figure 14:
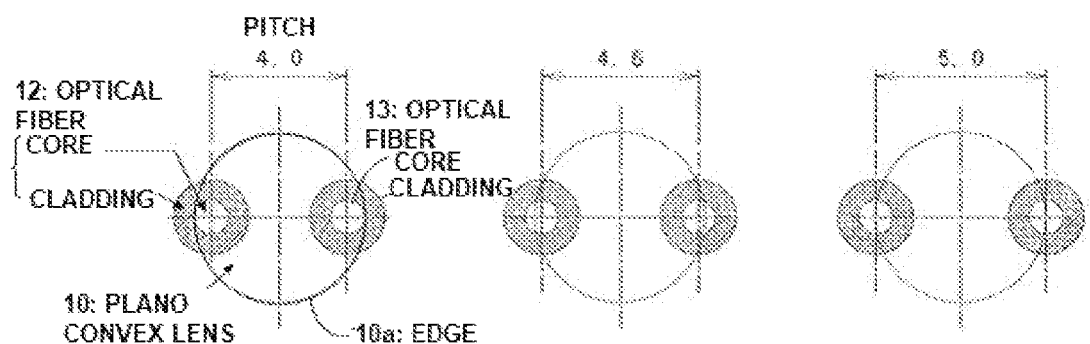
FIG. 14 is a diagram for explaining positions at which the outputting optical fiber and a light-receiving optical fiber abut against the plano-convex lens, which were tested in Example.

With regard to bringing the outputting optical fiber and the light-receiving optical fiber into abutment with the plano-convex lens, a distance (pitch) between the central axis A1 of the outputting optical fiber 12 and the central axis A2 of the light-receiving optical fiber 13 with respect to the plano-convex lens 10 was changed as shown in FIG. 14 in the detection unit 2 shown in FIGS. 3C and 3D in order to examine preferable positions of these optical fibers. For each pitch, the ratio (%) of the area of portions of the core of the outputting optical fiber 12 and the core of the light-receiving optical fiber 13 in abutment with the plane surface 10b of the plano-convex lens 10 relative to the cross-sectional area of these cores is obtained. The results are shown in FIG. 14. In this case, the specifications of the plano-convex lens 10 are as follows.

Specifications of Plano-Convex Lens

The material of the lens: synthetic silica

The diameter of the plane surface 10b: 5.0 mm

The radius of curvature of the convex surface 10c: 3.69 mm

The thickness of the edge 10a: 1.5 mm

Figure 15:
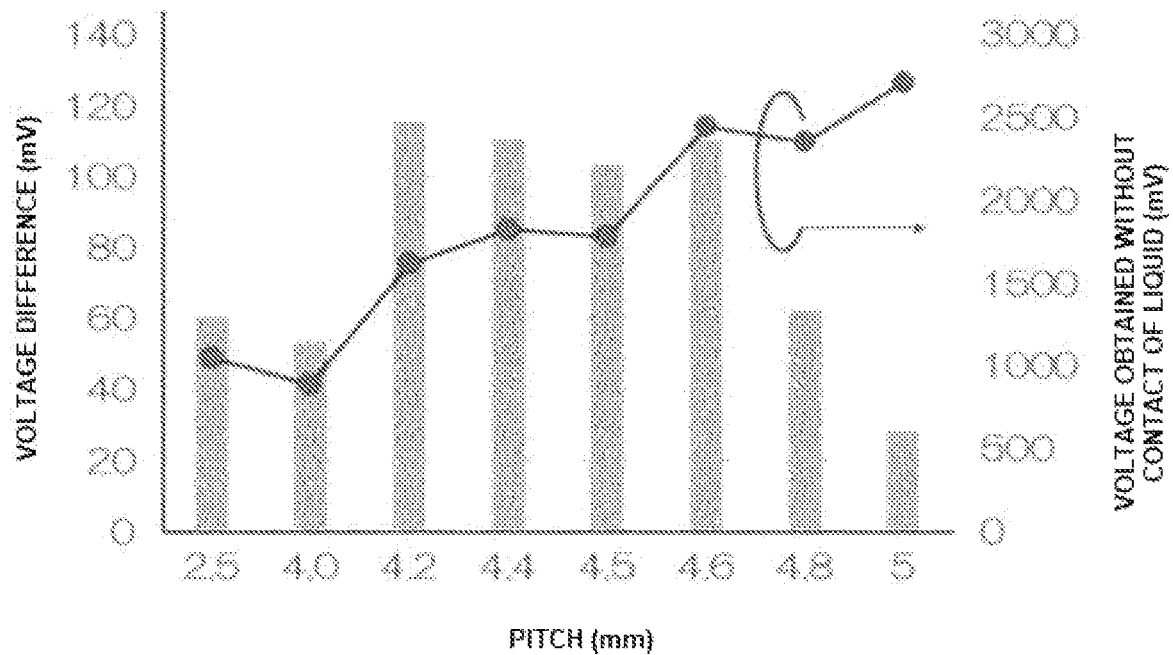
FIG. 15 includes a diagram showing a relationship between a pitch between the outputting optical fiber and the light-receiving optical fiber and a voltage obtained without the contact of liquid as well as a diagram showing a relationship between such a pitch and a voltage difference between liquids having different refractive indexes, which were measured in Example.

For each of the pitches, a voltage when no liquid was in contact with the plano-convex lens 10 was obtained in the light amount measuring unit. The results are shown in FIG. 15 (the right vertical axis in FIG. 15). Moreover, a voltage in each of the states of one in which the convex surface 10c of the plano-convex lens 10 was immersed in a liquid (water) having a refractive index of 1.33 and the other in which the convex surface 10c of the plano-convex lens 10 was immersed in a liquid (gasoline) having a refractive index of 1.44 was measured in the light amount measuring unit. A difference therebetween was then obtained. Such a voltage difference is also shown in FIG. 15 (the left vertical axis in FIG. 15).

The following can be seen from FIG. 15. If the core of the outputting optical fiber 12 and the core of the light-receiving optical fiber 13 are disposed on the edge 10a of the plano-convex lens 10, a voltage difference can be measured in the light amount measuring unit for each of the pitches upon changing the refractive index of a liquid to be in contact with the plano-convex lens 10. The voltage difference measured in this case is large not when all of the end faces of the optical fibers are in abutment with the plano-convex lens, but when the ratio of areas of respective portions of the cores of the outputting optical fiber and the light-receiving optical fiber in abutment with the plano-convex lens relative to the cross-sectional area of the cores is 95 to 73% (i.e., when the pitch between the outputting optical fiber and the light-receiving optical fiber is 4.2 to 4.6 mm).

It can be also seen that a pitch of 4.6 mm produces the largest voltage when the plano-convex lens is not in contact with any liquid among pitches between the outputting optical fiber and the light-receiving optical fiber falling within a range of 4.2 to 4.6 mm. Therefore, it can be seen that the pitch is preferably set to 4.6 mm in this measurement system in order to improve accuracy in determining liquid types.

REFERENCE SIGNS LIST 1 sensor for determining liquid types
2 detection unit
3 control unit
10 plano-convex lens
10a edge
10b plane surface
10c convex surface
11 lens holder
11a surface
12 outputting optical fiber
12a end face
13 light-receiving optical fiber
13a end face
4 light-shielding part
15 bush
16 bracket
17 reflector
18 channel
19 slant surface
30 housing
31 outputting optical connector
32 light-receiving optical connector
33 level display unit
34 warning lamp
35 rotary DIP switch
36 trimmer for sensitivity adjustment
37 hole portion
38 cutout portion
40 pipe
41 joint portion
42 pipe
3 liquid tank
A1, A2 central axis
D sensing area
h distance between convex surface of plano-convex lens and installation surface of sensor for determining liquid types
P installation surface
w rain water (water)
x liquid (chemical solution)
y liquid

The invention claimed is:

1. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein:
the outputting optical fiber is provided so that an end face of the outputting optical fiber is disposed on one end of the edge of the plano-convex lens, and
the sensor further comprises a reflector provided to be opposed to a convex surface of the plano-convex lens.

2. The sensor for determining a liquid type according to claim 1, wherein an end face of the light-receiving optical fiber is disposed on the one end of the edge of the plano-convex lens.

3. The sensor for determining a liquid type according to claim 2, wherein the end face of the light-receiving optical fiber is provided at a position symmetric to the end face of the outputting optical fiber with a center of the plane surface of the plano-convex lens serving as a point of symmetry.

4. The sensor for determining a liquid type according to claim 1, comprising a bracket to which the lens holder is fit, the bracket having a channel or a slant surface for guiding a liquid falling onto an upper surface of the bracket to an area under a convex surface of the plano-convex lens.

5. The sensor for determining a liquid type according to claim 1, wherein the light amount measuring unit includes a level display unit configured to emit light with different colors in accordance with the light amount.

6. The sensor for determining a liquid type according to claim 1, wherein the light amount measuring unit includes a warning lamp configured to turn on a predetermined lamp in accordance with the light amount.

7. The sensor for determining a liquid type according to claim 1, wherein the light-emitting unit emits red light.

8. The sensor for determining a liquid type according to claim 1, wherein a distance between the reflector and the light-receiving optical fiber is maintained within a range of 0.4 to 0.6 mm.

9. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein:
the outputting optical fiber is provided so that an end face of the outputting optical fiber is disposed on one end of the edge of the plano-convex lens,
a central axis of the outputting optical fiber at the end face thereof passes through the plane surface of the plano-convex lens, and
the sensor further comprises a reflector provided to be opposed to a convex surface of the plano-convex lens.

10. The sensor for determining a liquid type according to claim 9, wherein an end face of the light-receiving optical fiber is disposed on the one end of the edge of the plano-convex lens, and a central axis of the light-receiving optical fiber at the end face thereof passes through the plane surface of the plano-convex lens.

11. The sensor for determining a liquid type according to claim 9, wherein an end face of the light-receiving optical fiber is disposed on the one end of the edge of the plano-convex lens.

12. The sensor for determining a liquid type according to claim 9, comprising a bracket to which the lens holder is fit, the bracket having a channel or a slant surface for guiding a liquid falling onto an upper surface of the bracket to an area under a convex surface of the plano-convex lens.

13. The sensor for determining a liquid type according to claim 9, wherein the light amount measuring unit includes a level display unit configured to emit light with different colors in accordance with the light amount.

14. The sensor for determining a liquid type according to claim 9, wherein the light amount measuring unit includes a warning lamp configured to turn on a predetermined lamp in accordance with the light amount.

15. The sensor for determining a liquid type according to claim 9, wherein the light-emitting unit emits red light.

16. The sensor for determining a liquid type according to claim 9, wherein a distance between the reflector and the light-receiving optical fiber is maintained within a range of 0.4 to 0.6 mm.

17. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against a the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein
the outputting optical fiber is provided so that an end face of the outputting optical fiber is disposed on one end of the edge of the plano-convex lens, and
the sensor further comprises a bracket to which the lens holder is fit, the bracket having a channel or a slant surface for guiding a liquid falling onto an upper surface of the bracket to an area under a convex surface of the plano-convex lens.

18. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against a the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein
the outputting optical fiber is provided so that an end face of the outputting optical fiber is disposed on one end of the edge of the plano-convex lens, and
a central axis of the outputting optical fiber at the end face thereof passes through the plane surface of the plano-convex lens, and
the sensor further comprises a bracket to which the lens holder is fit, the bracket having a channel or a slant surface for guiding a liquid falling onto an upper surface of the bracket to an area under a convex surface of the plano-convex lens.

19. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against a the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein
the outputting optical fiber is provided so that an end face of the outputting optical fiber is disposed on one end of the edge of the plano-convex lens, and
the light amount measuring unit includes a level display unit configured to emit light with different colors in accordance with the light amount.

20. A sensor for determining a liquid type, comprising:
a plano-convex lens;
a lens holder configured to support the plano-convex lens via an edge of the lens, the edge extending in a straight line orthogonal to a plane surface of the plano-convex lens, and the lens holder being flush with an entirety of the edge extending in the straight line;
an outputting optical fiber that abuts against a the plane surface of the plano-convex lens to output light;
a light-receiving optical fiber that abuts against the plane surface of the plano-convex lens to receive light;
a light-emitting unit connected to the outputting optical fiber; and
a light amount measuring unit connected to the light-receiving optical fiber to measure a light amount, wherein
the outputting optical fiber is provided so that an end face of the outputting optical fiber is disposed on one end of the edge of the plano-convex lens, and
a central axis of the outputting optical fiber at the end face thereof passes through the plane surface of the plano-convex lens, and
the light amount measuring unit includes a level display unit configured to emit light with different colors in accordance with the light amount.

\* \* \* \* \*